United States Patent [19]

Stenzel et al.

[11] B  4,015,953

[45] Apr. 5, 1977

[54] FIRECHECK

[75] Inventors: Wallace I. Stenzel, Thiensville; Frederick W. Kufrin, Janesville; Donald J. Allen, Fort Atkinson, all of Wis.

[73] Assignee: Waukee Engineering Co., Milwaukee, Wis.

[22] Filed: July 7, 1975

[21] Appl. No.: 593,781

[44] Published under the second Trial Voluntary Protest Program on March 16, 1976 as document No. B 593,781.

Related U.S. Application Data

[62] Division of Ser. No. 409,401, Oct. 25, 1973.

[52] U.S. Cl. .................................. 48/192; 137/584
[51] Int. Cl.² ........................................ F23D 13/46
[58] Field of Search ............... 48/192; 137/75, 77, 137/315, 457, 468, 583, 584; 251/67; 220/88 A; 431/346

[56] References Cited
UNITED STATES PATENTS

| | | | |
|---|---|---|---|
| 2,169,411 | 8/1939 | Drane | 137/584 X |
| 2,332,380 | 10/1943 | Hess | 48/192 |
| 2,913,320 | 11/1959 | Williams | 48/192 |

*Primary Examiner*—Martin P. Schwadron
*Assistant Examiner*—Richard Gerard
*Attorney, Agent, or Firm*—Andrus, Sceales, Starke & Sawall

[57] ABSTRACT

A firecheck to be connected to a combustible gas line and including a casing having a gas inlet, a gas outlet and an access opening. A cover plate removably encloses the access opening and a burner screen is located within the casing between the inlet and the outlet and is disposed in communication with the access opening. A control valve is disposed within the casing for controlling the flow of gas through the casing and is movable between an open position and a closed position. The valve is moved to the open position through a manually operated mechanism and is locked in the open position. On release of the locking mechanism the valve is biased to the closed position. Removal of the cover plate from the casing acts to release the locking mechanism to thereby enable the biasing means to move the valve to the closed position.

9 Claims, 10 Drawing Figures

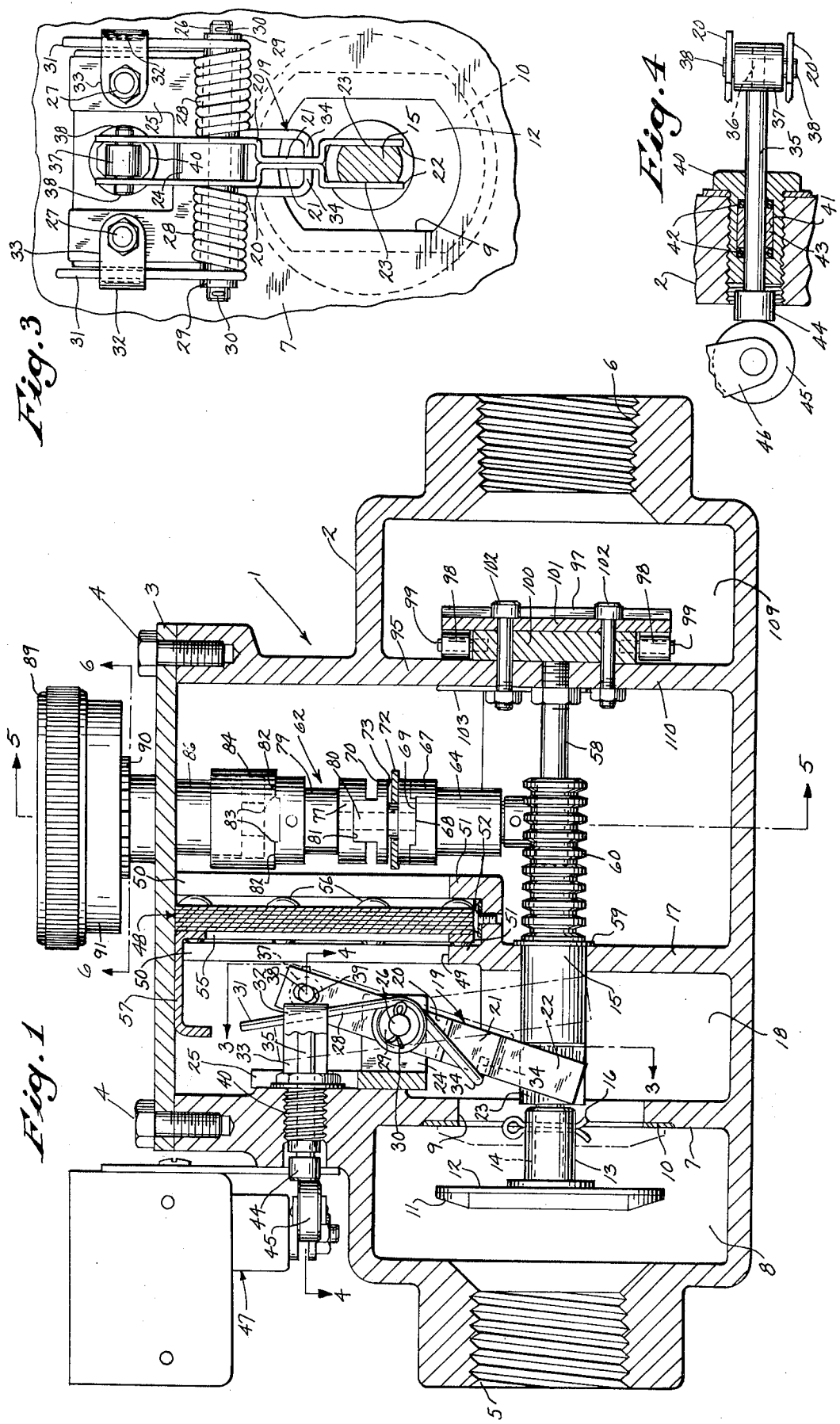

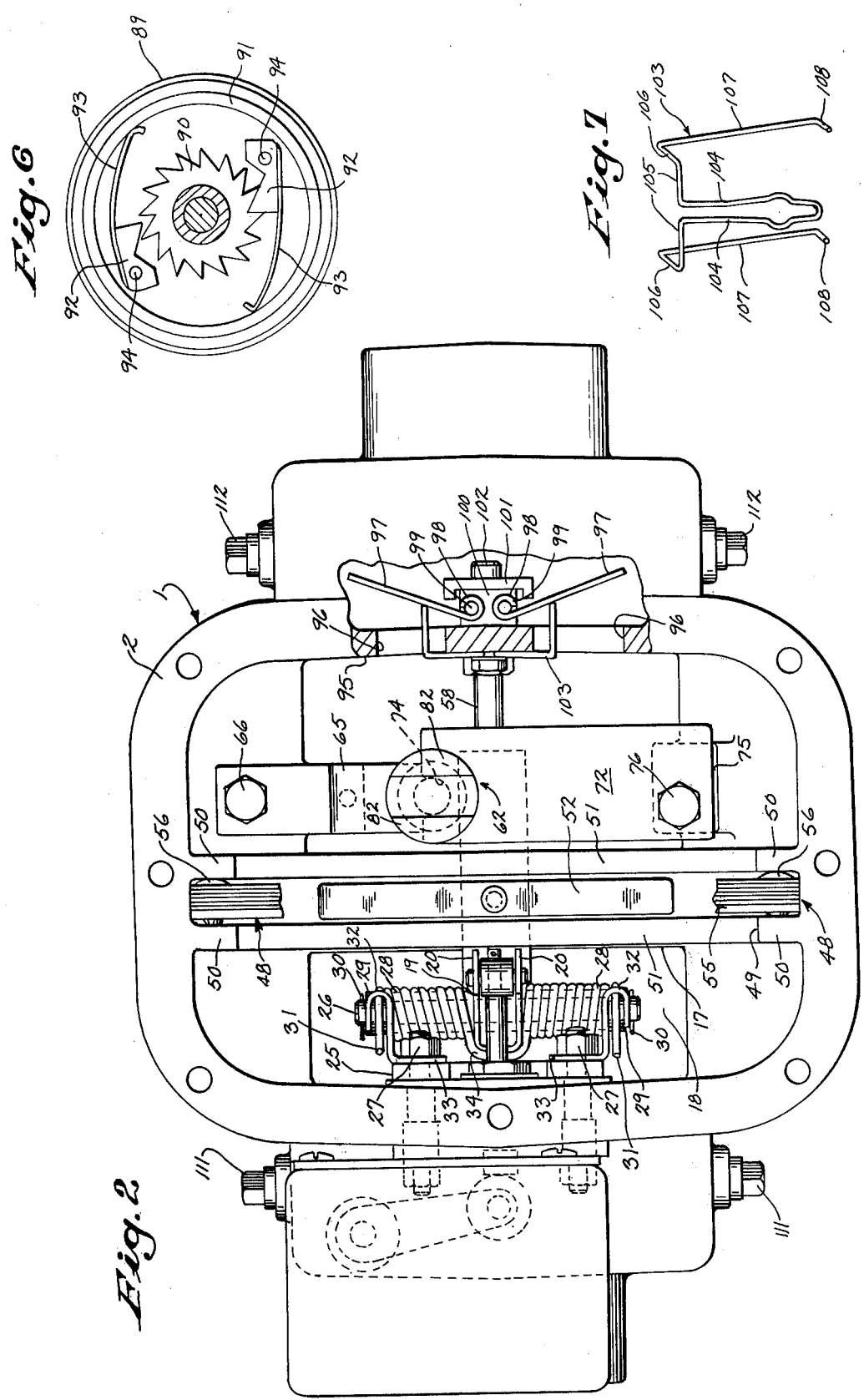

333
FIRECHECK

This is a division of application Ser. No. 409,401, filed Oct. 25, 1973.

BACKGROUND OF THE INVENTION

Firechecks are incorporated in a combustible fuel line and are used to protect the combustion system and its components from damage and to protect and safeguard operating personnel from injury resulting from deflagration and detonation caused by flash back. A firecheck normally includes a burner screen which prevents the passage of flame from the burner to the gas-air mixture device, and in the conventional firecheck, the flame burning on the screen will operate through a heat responsive mechanism to close a valve to shut off the flow of the combustible gas. However, under severe explosion or detonation conditions, a rapidly developing shock wave will precede the flame front and can impose damage on the burner screen and upstream equipment not designed to withstand the high pressures. Withstanding of the shock wave is the most difficult condition to meet, since many different types of combustible gas mixtures are used in industrial applications and many different pipeline configurations and pressure combinations are employed. Therefore, a firecheck, if properly designed, should withstand the extreme shockwave without damage to the burner screen or other components.

When detonation or flashback occurs, the firecheck should also provide an indication of valve closure, and the indication can be visual or a signal can be generated to actuate an alarm and/or shut down the complete system. After the cause of flashback or detonation has been corrected, the firecheck should be easily reset to its original condition.

As a further requirement, the firecheck should be designed for ease of service and maintenance. As previously noted, the shock wave from detonations can impose momentary high pressures on the screen and thus the firecheck should be designed so that the screen can be readily removed for cleaning or replacement.

SUMMARY OF THE INVENTION

The invention relates to an improved firecheck to be installed in a combustible fuel line. In accordance with the invention, the firecheck includes a casing having a combustible gas inlet, an outlet and a burner screen is located within the casing between the inlet and outlet.

A main control valve is disposed at the inlet and is adapted to be biased to the closed position by a spring loaded arm. The valve is moved to the open position manually by rotation of a hand knob which operates through a drive mechanism, including a pair of clutch units, and is held in the open position by a ratchet mechanism. One of the clutch units an be manually disengaged by pulling upwardly on the hand knob, thereby permitting the main control valve to close under the force of the spring loaded arm. The second clutch unit is adapted to be automatically disengaged under conditions of a downstream explosion or detonation or a slow burn back in the fuel line (deflageration) by the deflection of a bimetallic element located downstream and adjacent the burner screen.

As a feature of the invention the outlet is provided with a pair of openings and a pivotable gate or door is associated with each opening and is normally biased to an open position.

On a detonation downstream, the shock wave which precedes the flame front will act to pivot the doors to the closed position to retard the advance of the shock wave and the flame. The flame will burn on the downstream side of the burner screen, thereby heating the bimetallic element which will deflect to disengage the second clutch unit and permit the main control valve to move to the closed position. Closing of the valve will cut off the flow of the combustible gas mixture through the system.

The firecheck of the invention includes an improved burner screen which effectively prevents the flame from passing through the screen, thereby preventing the possibility of the flame advancing upstream to the gas-air mixing device or other components.

The use of the pivotable gates in conjunction with the openings at the outlet end of the firecheck enables the unit to withstand the severe shock waves resulting from explosion or detonation conditions. The initial surge of the shock wave will pivot the gates to the closed position, thereby retarding the propagation of the shock wave through the firecheck and preventing the extreme high pressure conditions from acting directly against the burner screen and other equipment located upstream of the firecheck.

The firecheck of the invention also provides an indication of valve closure. A pin is mounted for sliding movement in the casing and is connected to the spring loaded arms which bias the valve to the closed position. When the valve is closed, the pin will project outwardly to the casing thereby providing a visual indication of valve closure, or alternately, the pin can operate an alarm system or shut down the system.

The firecheck has improved maintenance and service features in that by removal of a single cover plate, the burner screen and other components can be removed from the casing for cleaning or replacement. Furthermore, removal of the cover will automatically close the main valve.

The unit also provides a positive shutoff for the gas-fuel mixture. The main control valve is provided with a resilient face or seal which seats against a machined valve seat formed in the wall of the casing adjacent the inlet. After flashback or detonation conditions the control valve will be closed and engagement of the resilient seal with the machined seat provides a positive seal against gas flow. Because of the location of the main valve, upstream gas pressure will assist in sealing the valve to the seat.

As a further feature, the main control valve is located immediately downstream of the inlet and the valve seat is a portion of an internal cast wall of the casing. Thus, there is no possibility of gas leakage through other components of the mechanism when the valve is closed.

The firecheck of the invention can also be mounted in any desired position in the pipeline, for the firecheck offers the same degree of pressure drop and position of the internal components regardless of the position or attitude of mounting.

Other objects and advantages will appear in the course of the following description.

DESCRIPTION OF THE DRAWINGS

The drawings illustrate the best mode presently contemplated of carrying out the invention.

In the drawings:

FIG. 1 is a longitudinal section of the firecheck of the invention;

FIG. 2 is a top plan view of the firecheck with the cover removed and parts broken away in section;

FIG. 3 is a section taken along line 3—3 of FIG. 1 and showing the spring loaded arms for biasing the control valve to the open position.

FIG. 4 is a section taken along line 4—4 of FIG. 1;

FIG. 6 is a section taken along line 6—6 of FIG. 1 and showing the ratchet and pawl mechanism;

FIG. 7 is a perspective view of the spring employed to bias the gates to the open position;

DESCRIPTION OF THE PREFERRED EMBODIMENT

Figure 5:
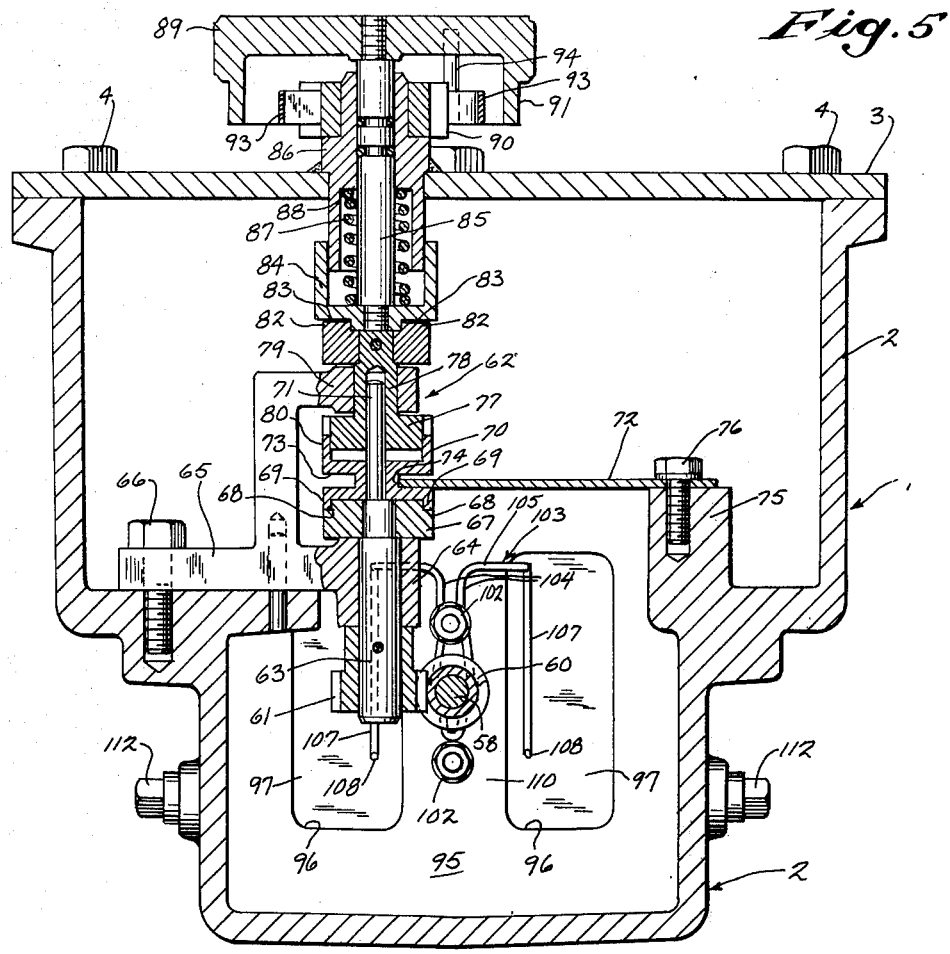
FIG. 5 is a section taken along line 5—5 of FIG. 1.

The drawings illustrate a firecheck 1 adapted to be connected in a combustible fuel line between an gas-air mixing device and a burner, not shown. The firecheck 1 includes an outer casing 2 having an opening which is enclosed by a cover plate 3. Bolts 4 serve to secure the cover plate 3 to the open end of the casing 2.

As shown in FIG. 1, the casing 2 is provided with a gas inlet 5, and an outlet 6, located diametrically opposite the inlet 5. Casing 2 also includes an internal wall 7 which, in combination with the casing 2, defines an inlet chamber 8. As best illustrated in FIG. 1, the wall 7 is provided with an opening 9 and a machined, annular, metal disc 10 borders the opening and is mounted within a recess in the wall and provides a seat for a valve 11. The downstream surface of valve 11 is provided with a resilient gasket 12 which is adapted to seat against the seat 10 and provides a positive shutoff for gas flow through the firecheck.

Valve 11 includes a stem 13 having a central bore which receives the reduced diameter end 14 of a shaft 15. The bore in stem 13 has a slightly greater diameter than that of the end 14, thereby enabling the valve 11 to wobble or swivel slightly on the end of the shaft and insuring a positive seal against the seat 10. Cotter pin 16 connects the end 14 of shaft 15 to the valve stem 13.

The central portion of the shaft 15 is mounted for sliding movement within an opening in a central wall 17 which is generally parallel to the wall 7. Walls 7 and 17, in combination with casing 2, define a chamber 18.

The valve 11 is adapted to be biased to the open position by a biasing mechanism 19 located within chamber 18. The biasing mechanism 19 includes a pair of arms 20 and the central portions 21 of the arms are bent inwardly and connected together in flatwise relation by rivets. The lower ends 22 of arms 20 are spaced apart and straddle the flat surfaces 23 formed on the end of the shaft 15. The ends 22 of the arms act against the shoulders bordering the flat surfaces 23 to move the valve 11 to the closed position. The central portions 21 of the arms 20 are pivotally connected to lugs 24, which extend outwardly from a bracket 25 mounted on the casing 2, by a pivot pin 26. The bracket 25 is secured to the casing 2 by studs 27.

To provide a biasing force to urge the arms 20 in a counterclockwise direction, as shown in FIG. 1, a pair of torsion springs 28 are wound about spacer sleeves 29 that are mounted on the ends of the pin 26. Retainers 30 are located on the ends of the pin 26 and maintain the sleeves 29 in position. As best illustrated in FIGS. 1 and 3, one end 31 of each torsion spring is received within the bent end 32 of extension 33 of bracket 25, while the opposite end 34 of each spring is bent around the edge of the respective arm 20. Thus, the force of the springs 28 acts to pivot the arms 20 in a counterclockwise direction, as shown in FIG. 1, and urge the valve 11 to the closed position.

To provide an indication of the position of the valve 11, an indicator pin 35 is connected to the arms 20. As shown in FIG. 4, the inner end 36 of pin 35 has a reduced diameter and is secured within a block 37 mounted between the upper ends of the arms 20. The block 37 is provided with a pair of laterally extending projections 38 which are received within slots 39 in the respective arms 20.

The pin 35 is mounted for sliding movement within a central bore of a stud 40 which is threaded within an opening in the casing 2. As best shown in FIG. 4, the stud 40 is provided with a central recess 41 that communicates with the axial bore and a pair of O-ring seals 42 are located at the ends of the recess and are separated and retained by sleeve 43. The pin 35 is adapted to slide within the axial bore of the stud and the O-rings 42 provide a seal for this sliding movement.

The outer end of the pin 35 is provided with an enlarged head 44 and when the valve 11 is moved to the closed position by the spring loaded arms 20, the pin 35 will be moved outwardly thereby providing a visual indication of the position of the valve. Alternately, as shown in FIG. 1, the pin 35 can be utilized to actuate a signal and in this regard the head 44 of the pin 35 is engaged with a roller 45 carried by a pivoting arm 46 of switch assembly 47. With this construction, outward movement of the pin 45 caused by closing of the valve 11 will actuate the switch assembly 47 to thereby operate a warning signal which can be visual or audio or can shut down the system.

To prevent the propagation of flame downstream through the firecheck, a burner screen 48 is employed. As shown in FIGS. 1 and 2, the burner screen 48 is mounted across an oening 49 formed in the upper end of the internal wall 17. To mount the screen 48 within the casing, the opposite ends of the casing are provided with ribs or guides 50 which receive the side edges of the screen, and the wall 17 is similarly formed with a pair of upstanding ribs or guides 51 which define a slot that receives the lower edge of the screen. With the cover plate 3 removed, the burner screen 48 can be readily inserted or withdrawn from the casing.

To urge the screen 48 upwardly in tight bearing engagement with the cover plate 3, a leaf spring 52 is mounted between the upstanding guides 51 and bears against the lower edge of the burner screen 48. The leaf spring 52, by urging the burner screen upwardly, insures that there will be no gap between the upper edge of the burner screen and the cover plate 3 through which the flame could advance upstream beyond the screen.

Figures 8, 9:
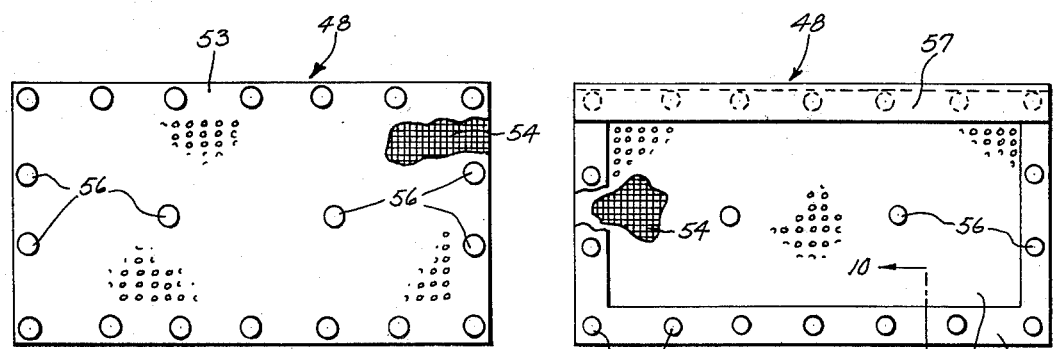
FIG. 8 is a plan view of the downstream side of the burner screen.
FIG. 9 is a plan view of the upstream side of the burner screen.
Figure 10:
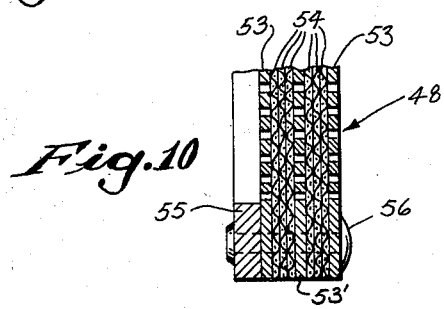
FIG. 10 is a section taken along line 10—10 of FIG. 9.

The screen 48 is best illustrated in FIGS. 8-10 and includes outer layers 53 and central layer 53' formed of perforated metal and a series of woven wire screens 54 are located between the perforated plates 53. The plates 53 and screens 54 provide a labyrinth-type of construction which prevents the flame from passing through the burner screen.

As shown in FIG. 9 the upstream side of the burner screen 48 is reinforced by a generally rectangular backing plate 55 and a series of rivets 56 extend through the screen to tie the plates 53, screens 54 and backing plate 55 together.

To provide added rigidity for the burner screen to withstand the force of shock waves, a flange 57 extends outwardly from the upper end of the backing plate 55 and bears against the underside of the cover plate 3.

The end of the shaft 15 is mounted for sliding movement on a guide pin 58 that is slidably received within an axial bore in the end of the shaft 15. A stop collar 59 is secured to the central portion of the shaft 15 and serves to limit the outward movement of the shaft and valve 11. The portion of the shaft 15 located downstream of the stop collar 59 is provided with a circular rack 60 which is engaged by a gear 61 driven through a drive mechanism indicated generally by 62.

The drive mechanism 62 includes a shaft 63 which carries gear 61 and the central portion of the shaft is journalled within a bushing 64 located in the lower arm of a C-shaped bracket 65. As shown in FIG. 5, bolts 66 connect the C-shaped bracket to the casing 2.

A clutch disc 67 is mounted on the shaft 63 above the bushing 64, and clutch disc 67 is provided with a pair of diametrically opposed notches 68 which are adapted to receive downwardly extending projections 69 on a clutch member 70 which is mounted for sliding movement on the reduced upper end 71 of shaft 63. With the projections 69 engaged with the notches 68 a driving connection is provided between the members 70 and 67.

The clutch member 70 is adapted to be moved vertically on the shaft end 71 to disengage the driving connection with disc 67 through deflection of a bimetallic element 72. The bimetallic element extends within a groove 73 formed in the clutch member 70, and the end of the element is provided with a semicircular recess 74 which surrounds the central hub portion of the clutch member 70. The outer end of the element 72 is connected to a boss 75 by bolt 76. When the bimetallic element 72 is heated through the flame burning on the screen 48, the element will deflect upwardly causing disengagement of the clutch member 70 from the clutch disc 67.

A clutch spool 77 is also mounted on the upper end 71 of shaft 63 and the central portion 78 of spool 77 is journalled within a bushing 79 located in the upper arm of the C-shaped bracket 65. The upper end of clutch member 70 is provided with a pair of diametrically opposed upstanding ears 80 which are received within slots 81 formed in the lower end of spool 77. Engagement of the ears 80 with slots 81 provides a driving connection between the spool 77 and the clutch member 70.

The ears 80 have a substantially greater axial height than the projection or ears 69 on the lower end of the clutch member 70, so that the ears 80 will retain engagement with the slots 81, when the clutch member 70 is at its lowermost position on the shaft end 63. Thus, the ears 80 on clutch member 70 will retain engagement with the slots 81, even though the projections or ears 69 on the lower end of the clutch member 70 have been disengaged from the notches 68 is disc 67 through upward deflection of the bimetallic element 72.

The upper end of the clutch spool 77 is provided with a pair of diametrically opposed upstanding ears 82 which are received within slots 83 formed in the lower end of a cup-shaped clutch member 84. The hub portion of the clutch member 84 is secured to the lower end of the shaft 85 and the upper end of the shaft is journalled within a sleeve 86 that is secured within an opening in the cover plate 3. As best shown in FIG. 5, the lower end of the sleeve 86 is slidably received within the open upper end of the clutch member 84 and a coil spring 87 surrounds the shaft 85 and bears between an internal shoulder 88 in the sleeve 86 and the base of the clutch member 84, thereby biasing the clutch member 84 downwardly into driving engagement with the clutch spool 77.

The upper end of the shaft 85 carries a handknob 89 and by rotation of the handknob in a clockwise direction the drive mechanism 62 will be operated to rotate gear 61 which operates through rack 60 to move the valve 11 to the open position.

To lock the valve in the open position a pawl and ratchet mechanism is employed. As best illustrated in FIG. 6, a ratchet 90 is secured to the upper end of the sleeve 86 and is located within the downwardly extending flange 91 of the handknob. A pair of pawls 92 are mounted on spring arms 93 which bear against the inner surface of the flange 91 and each pawl is pivoted to the undersurface of the handknob 89 by a pin 94. The spring tension in arms 93 tends to urge the pawls 92 radially inward toward the teeth of the ratchet 90.

The ratchet and pawl mechanism permits the handknob 89 to be rotated in a clockwise direction to thereby move the valve to an open position, but prevents rotation of the handknob in the opposite direction, thereby locking the valve at any desired position. The pawls 92 are arranged so that at any one location only one of the pawls is in engagement with the ratchet teeth 90, thereby increasing the sensitivity of the locking mechanism without reducing the size of the ratchet teeth.

The drive mechanism, indicated generally by 62, is provided with two clutch units, either of which can be disengaged to disconnect the drive mechanism and permit the spring loaded arms 20 to move the valve 11 to the closed position. One of the clutch mechanisms can be manually released by pulling upwardly on the knob 89 which thereby acts to raise the clutch member 84 and disengage the ears 82 on clutch spool 77 with the slots 83 in the clutch member 84. With the clutch member 84 disengaged from the clutch spool 77, the pawl and ratchet locking mechanism will no longer be effective and the spring loaded arms 20 will act to move the valve 11 to the closed position.

The other clutch mechanism is adapted to be automatically disengaged by deflection of the bimetallic element 72. When the bimetallic element is heated by the flame burning on the burner screen 48 the element will deflect upwardly thereby disengaging the clutch member 70 from the disc 67. With the clutch members 67 and 70 disengaged, the arms 20 can then move the valve to the closed position.

To retard the propagation of shock waves from detonations or explosions upstream through the firecheck the internal wall 95 of the casing 2 adjacent the outlet 6 is provided with a pair of openings or windows 96 which are located on either side of the centerline of the outlet 6. The windows are adapted to be closed by doors or gates 97. The upper and lower ends of each gate 97 are provided with hinge loops 98 which are mounted on hinge pins 99 that project from the ends of the block 100. The block 100 is secured to the outer surface of the wall 95 by means of a generally C-shaped bracket 101 which bears against the outer surface of the block and is secured to the wall 95 by means of bolts 102.

The gates 97 are biased to an open position in a downstream direction by means of a spring 103 so that under normal operating conditions, the gates are open, permitting flow of the combustible fuel mixture through the windows 95 to the outlet 6.

As best shown in FIG. 7, the spring is provided with a pair of central legs 104 which are secured against the inner portion of wall 95 by the upper of the two bolts 101. Generally horizontal arms 105 extend laterally from the legs 104 and the ends of the arms are bent in a downstream direction, as indicated by 106, and angular leg sections 107 extend downwardly from bends 106 through the respective windows 96. The leg sections 107 terminate in bent ends 108. The lower ends of the leg sections 107 bear against the respective gates 97 to urge the gates to the open position in which the gates are located within the chamber 109 between wall 95 and outlet 6.

In the event of an explosion or detonation downstream, the initial axial shock wave which precedes the flame front will strike the gates 97 moving the gates to the closed position which will tend to retard the advance of the shock wave and flame front and protect the burner screen 48, as well as other equipment located upstream of the firecheck.

It has been found that the shock wave is most concentrated in the center or axis of the outlet 6, and as the section 110 of the wall 95 between the windows 96 is located in alignment with the center of the outlet 6, the section 110 bears the thrust of the most concentrated portion of the shock wave. With the construction of the invention there is minimum movement of the check gates 97 at the center wall section 110 where they are hinged, and the primary movement of the gates is at their outer edges where the effect of the shock wave is less.

A pair of plugs 111 are threaded into openings in the casing which communicate with inlet chamber 5, and similarly plugs 112 are threaded in openings that communicate with outlet chamber 6. By removing one of the plugs 111 and one of the plugs 112 and installing pressure gauges in the threaded openings, the pressure differential can be measured which can be useful in checking the unit for leakage as well as providing an addition of a clogged burner screen 48.

In operation of the firecheck, the valve 11 is initially moved to the open position by rotating the handknob clockwise until the stop ring 59 engages the internal wall 70. The pawl and ratchet mechanism 92 and 90 will maintain the valve in the open position.

In the event there is an explosion downstream of the firecheck, the shock wave preceding the flame front will initially strike the open gates 97, momentarily forcing the gates to the closed position and thereby retarding the progress of the shock wave. The flame which follows the shock wave will enter the firecheck and will burn on the downstream side of the burner screen 48, thereby heating the bimetallic element 72 and causing the element to deflect upwardly to disengage the clutch member 70 from clutch member 67 and disconnect the drive mechanism 62. With the drive mechanism disconnected, the spring loaded arms 20 will act to move the valve 11 to the closed position to prevent the flow of the combustible gas-air mixture into the firecheck.

Simultaneously, pivotal movement of the arms 20 will move the indicator pin 26 outwardly to thereby actuate the switch 47 to thereby sound an alarm or shut down the system. As previously noted, if the switch assembly is not utilized the outward position of pin 26 will indicate the closed position of the valve 11.

In some instances, it may be desirable to close valve 11 manually and this can be done by lifting the handknob 89 upwardly, thereby disengaging the clutch members 84 and 77 and enabling the spring loaded arms 20 to move the valve to the closed position. The manual release can be utilized as an inspection procedure to determine whether the parts are in operable order, to check for leakage and to inspect the burner screen 48. As the handknob 89 is carried by the cover plate 3, the removal of the cover plate will serve to elevate the knob 89 and disengage the drive mechanism, so that the valve 11 will automatically be moved to the closed position whenever the cover plate 3 is removed. Thus, it is not possible to remove the cover plate with the valve 11 in the open position.

The use of the two windows 96 in conjunction with the gates 97 acts to slow down or retard the effect of the shock wave caused by detonation downstream and further lessens the ability of the flame to pass through the burner screen. With this construction the burner screen 48, main valve 11 and the valve closing mechanism do not sustain the high pressure waves and will not become damaged when the shock wave enters the firecheck.

The flame will burn on the downstream side of the screen 48 and due to the action of the leaf spring 52 which urges the burner screen tightly against the cover plate 3, there is no tendency for the flame to leak past the burner screen.

The unit can be easily serviced by merely removing the cover plate 3 and due to the fact that the handknob 89 and sleeve 86 are carried by the cover plate, the drive mechanism will automatically be disengaged when the cover plate is removed so that the valve 11 will be moved to the closed position by the spring loaded arms 20. With the cover plate removed, all of the elements of the drive mechanism 62 are readily visible and the burner screen can be merely slid from the guide ribs 50 for cleaning or repair.

The valve 11, when moved to the closed position, provides a positive shutoff for the flow of the gas-air mixture through the firecheck. As the valve 11 is located in the chamber 8 which does not contain other components of the system, there is no possibility of gas leaking through the components to bypass the closed valve.

The unit can be mounted in any position or attitude and the operation in all positions will be the same. The spring 103 which urges the gates 97 to the open position is not necessary when the inlet 5 and the outlet 6 are located horizontally, or when the outlet is located below the inlet, for the pressure of the gas-air mixture flowing through the firecheck will maintain the gates in an open position. However, the spring 103 is helpful in maintaining the gates in the normal open position in the event the unit is located vertically with the outlet 6 above the inlet 5, in which case the spring 103 opposes the force of gravity and will maintain the gates in the open position.

Various modes of carrying out the invention are contemplated as being within the scope of the following claims particularly pointing out and distinctly claiming the subject matter which is regarded as the invention.

We claim:

1. A firecheck adapted to be connected in a combustible gas line, comprising a casing having an inlet and an outlet and an access opening, a cover plate to removably enclose the access opening, a burner screen located within the casing between the inlet and the outlet and disposed in communication with said access opening, control valve means disposed within the casing for controlling the flow of gas through the casing and movable between an open position and a closed position, opening means for moving the valve means to the open position, valve closing means for moving the valve means to the closed position, and means responsive to removal of the cover plate from the casing for actuating said valve closing means to move said valve means to the closed position.

2. The firecheck of claim 1, and including guide means located within the casing in alignment with said access opening to slidably receive the burner screen.

3. The firecheck of claim 2, and including resilient means for urging the burner screen upwardly against the cover plate.

4. A firecheck to be used in a combustible gas line, comprising a casing having an inlet and an outlet and an access opening, a cover plate to removably enclose the access opening, a burner screen located within the casing between the inlet and the outlet, control valve means disposed within the casing for controlling the flow of gas through the casing and movable between an open position and a closed position, valve opening means for moving said valve means to the open position, locking means for locking the valve means in the open position, valve closing means for biasing the valve means to the closed position on release of said locking means, and means responsive to removal of the cover plate from the casing for releasing said locking means, whereby said valve closing means will move the valve means to the closed position.

5. The firecheck of claim 4, wherein said opening means comprises a drive mechanism located within the casing and operably connected to said valve means and a manual operating member located on the outside of the cover plate and connected to said drive mechanism, said operating member being fixed to said cover plate and being removably connected to said drive mechanism, said means responsive to removal of the cover plate acting to release said locking means and disconnect said operating member from said drive mechanism.

6. The firecheck of claim 4, wherein said casing includes internal wall means and said internal wall means and said casing define an inlet chamber communicating with said inlet, said internal wall means having an opening with the portion of the wall bordering the opening defining a valve seat, said control valve means including a valve member disposed within the inlet chamber and adapted to engage the valve seat to close said opening, said valve means also including a valve stem extending through said opening, said valve opening means being operably connected to said valve stem.

7. The firecheck of claim 6, wherein said valve opening means includes a drive mechanism operably connected to said valve stem and a manual operating member located on the exterior of the cover plate and connected to said drive mechanism.

8. The firecheck of claim 4, wherein said valve opening means comprises a manually operable drive mechanism drivingly connected to said valve means, said locking means being connected to said drive mechanism, said drive mechanism including clutch means having an engaged and disengaged position, and clutch release means connected to the cover plate in a manner such that removal of said cover plate acts to move said clutch means to the disengaged position to thereby disengage the drive mechanism and render the locking means ineffective.

9. The firecheck of claim 4, wherein said valve opening means comprises a drive mechanism located within the casing and operably connected to said valve means and a manual operating member located on the outside of the cover plate and connected to said drive mechanism, said drive mechanism also includes first clutch means and second clutch means with both said first and second clutch means having an engaged and disengaged position, said cover plate being connected to said first clutch means whereby removal of the cover plate will move said first clutch means to the disengaged position to thereby disconnect said drive mechanism from said valve means to enable said valve closing means to move said valve means to the closed position, and means responsive to burning of the combustible gas on the downstream side of the burner screen to move the second clutch means to the disengaged position to thereby disconnect said drive mechanism from said valve means and enable said valve closing means to bias the valve means to the closed position.

* * * * *

UNITED STATES PATENT AND TRADEMARK OFFICE
CERTIFICATE OF CORRECTION

PATENT NO. : 4,015,953
DATED : April 5, 1977
INVENTOR(S) : WALLACE I. STENZEL ET AL It is certified that error appears in the above-identified patent and that said Letters Patent are hereby corrected as shown below:

Column 1, Line 58, Cancel "an" and substitute therefor ---can---
Column 2, Line 14, After "screen" insert ---design---,
Column 7, Line 52, Cancel "addition" and substitute therefor ---indication---

Signed and Sealed this

Twentieth Day of September 1977

[SEAL]

Attest:

RUTH C. MASON
Attesting Officer

LUTRELLE F. PARKER
Acting Commissioner of Patents and Trademarks